United States Patent
Herdrich et al.

[15] 3,678,436
[45] July 18, 1972

[54] MAGNETIZING APPARATUS AND METHOD

[72] Inventors: William M. Herdrich; Norman A. Bender, both of Fort Wayne, Ind.

[73] Assignee: General Electric Company

[22] Filed: May 24, 1971

[21] Appl. No.: 146,133

[52] U.S. Cl. .................................... 335/284, 310/156
[51] Int. Cl. ........................................... H01f 13/00
[58] Field of Search .......................... 335/284; 310/156

[56] References Cited

UNITED STATES PATENTS

| | | | |
|---|---|---|---|
| 2,439,827 | 4/1948 | Sterenbuch et al. | 335/284 |
| 3,335,377 | 8/1967 | Kohlhagen | 335/284 |

*Primary Examiner*—George Harris
*Attorney*—John M. Stoudt, Ralph E. Krisher, Jr., Radford M. Reams, Joseph B. Forman, Frank L. Neuhauser and Oscar B. Waddell

[57] ABSTRACT

Apparatus and method for magnetizing a permanent magnet rotor member for a dynamoelectric machine, the rotor member including four members formed of permanent magnet material each having transversely spaced surface areas to be oppositely polarized. A magnetic stator core member is provided having a yoke portion with a plurality of radially inwardly extending teeth defining winding slots therebetween, the teeth being divided into four circumferentially spaced groups and having inner ends defining a bore for receiving the rotor member. Four windings are provided each comprising a plurality of concentric coils distributed in respective ones of the slots of one of the groups of teeth. The windings are connected in parallel and arranged when energized to excite alternate tooth groups to form opposite poles respectively aligned with the areas to be polarized. A capacitor discharge power supply is coupled to the windings for producing thereacross a momentary high voltage pulse of preselected magnitude thereby to cause a highly peaked surge of current flow in the windings. The preferred method includes establishing a short duration highly peaked magnetic field in preselected regions of space and magnetizing permanently magnetizable members previously disposed in those regions.

14 Claims, 5 Drawing Figures

PATENTED JUL 18 1972

INVENTORS:
WILLIAM M. HERDRICH
NORMAN A. BENDER
BY Ralph E. Krisher Jr.
ATTORNEY

INVENTORS:
WILLIAM M. HERDRICH
NORMAN A. BENDER

BY Ralph E. Krisher Jr.
ATTORNEY 3,678,436

1

MAGNETIZING APPARATUS AND METHOD

BACKGROUND OF THE INVENTION

This invention relates generally to apparatus for magnetizing permanent magnets, and more particularly to apparatus for magnetizing the permanent magnets of rotor members for dynamoelectric machines.

Certain dynamoelectric machines, such as small synchronous motors, are permanent magnet-exited. A conventional permanent magnet-excited synchronous motor incorporates a rotor member comprising a laminated ring of magnetic material having slots therein carrying a squirrel cage winding, the ring surrounding and being carried by a plurality of transversely polarized permanent magnets which, in turn, are carried by the shaft. In assembling such a rotor member, unmagnetized bars of permanent magnet material are secured to the shaft and the outer periphery of the bars is then machined to receive the laminated ring. The laminated ring having the squirrel cage winding previously die-cast therein is then heat-shrunk onto the bars which, when magnetized, will become the permanent magnets. Since no keeper is provided for the magnets in the absence of the laminated ring, and further by reason of the machining and heat-shrinking operations, it is desirable to magnetize the magnets following assembly of the rotor member.

Heretofore, such permanent magnet-excited rotor members have been magnetized with apparatus employing a pole piece having magnetizing windings positioned on solid, salient pole pieces, the magnetizing windings being energized by a capacitor-discharge type power supply with the capacitors being charged by relatively low D.C. voltage provided by a motor-generator set. With such prior magnetizing apparatus, a period on the order of 1 to 1½ hours was required for magnetizing six rotors, it then being necessary to shut down the apparatus for four hours to permit the windings on the pole pieces to cool.

It is accordingly an object of the invention to provide improved apparatus and methods for magnetizing a permanent magnet rotor member for a dynamoelectric machine.

Another object of the invention is to provide improved apparatus and methods for magnetizing a permanent magnet rotor member for a dynamoelectric machine wherein a substantially greater number of rotor members may be magnetized in substantially less time than has been possible with apparatus heretofore employed.

SUMMARY OF THE INVENTION

In the practice of the invention in one form, we provide a stator assembly having the windings distributed in slots in a stator core. In addition, we energize the windings with a power supply to produce a momentary high voltage pulse thereby to cause a highly peaked surge of current flow in the windings, 15 rotor assemblies can be magnetized in approximately 20 minutes before it is necessary to shut down the apparatus to permit cooling the windings.

In one preferred exemplification, we provide apparatus for magnetizing magnetic means comprising one or more magnet members of a rotor device or means for a dynamoelectric machine, at least one of the members being formed of permanently magnetizable material and having at least one pair of areas to be oppositely polarized. The apparatus comprises a laminated stator core member having a yoke portion with the plurality radially inwardly extending teeth defining winding slots therebetween, the teeth having inner ends defining a bore for receiving the rotor member. At least one pair of windings is provided, each comprising a plurality of concentric coils distributed in respective ones of the slots, the pair of windings being connected and arranged when energized to form opposite magnetic poles in the core member respectively aligned with the areas to be polarized. Power supply means is provided coupled to the windings for producing thereacross a momentary high voltage pulse of preselected magnitude thereby to cause a highly peaked surge of current flow in the windings.

2

The subject matter which we regard as our invention is set forth in the appended claims. The invention itself, however, along with further objects and advantages thereof will be best understood by reference to the following description of a preferred exemplification of the invention taken in conjunction with the accompanying drawings.

BRIEF DESCRIPTION OF THE DRAWINGS fIG. 1 is a side elevational view of the apparatus embodying the invention that may be used to practice the invention;

DESCRIPTION OF THE PREFERRED EMBODIMENT

Figure 1:
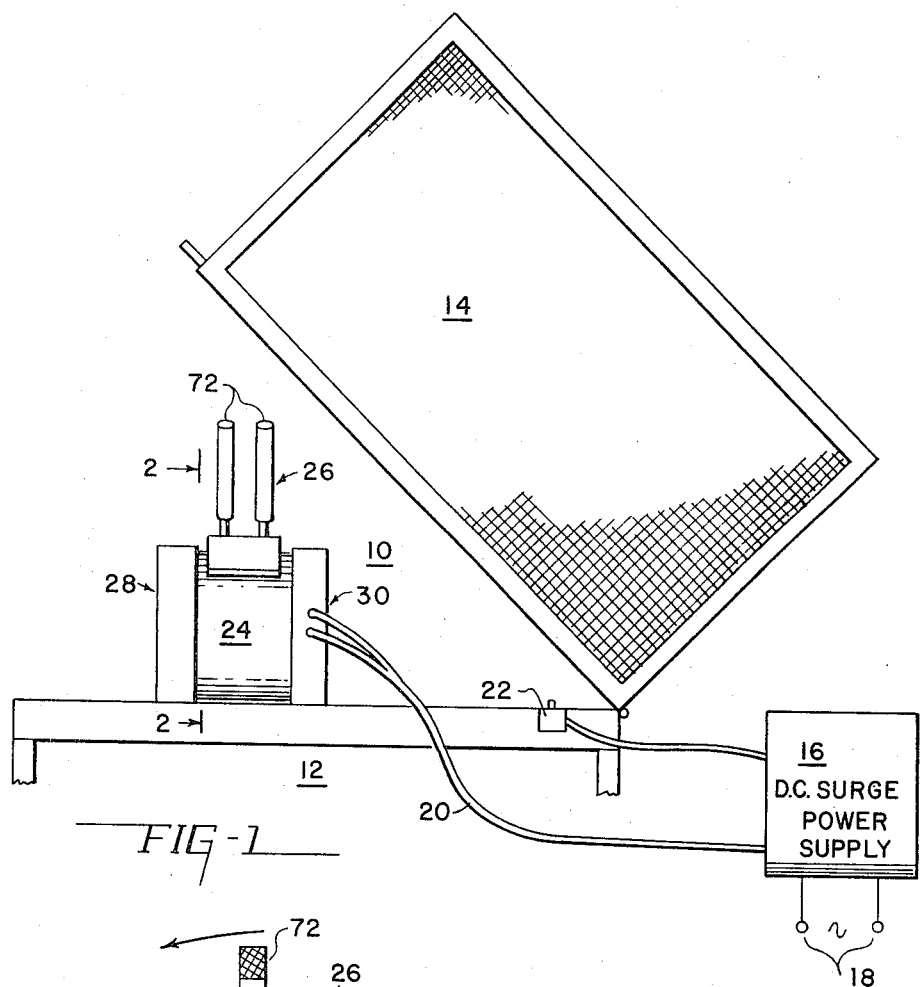

Referring now to FIG. 1 of the drawings, one form of magnetizing apparatus embodying the invention, generally indicated at 10, may be supported on worktable 12 having protective enclosure 14 pivotally mounted thereon. Direct current surge power supply 16 may be of the type disclosed, inter alia, in U.S. Pat. No. 3,333,329 to C. E. Linkous (assigned to the assignee of the present application) and is energized by source 18 of single phase, alternating current potential. The power supply 16 is coupled by leads 20 to magnetizing apparatus 10 for energizing the windings thereof, as will hereinafter be described. Interlock 22 on table 12 is coupled to power supply 16 for disabling the same when protective enclosure 14 is raised to permit loading a rotor member to be magnetized into magnetizing apparatus 10, and subsequently to permit removal of the magnetized rotor member.

Figure 2:
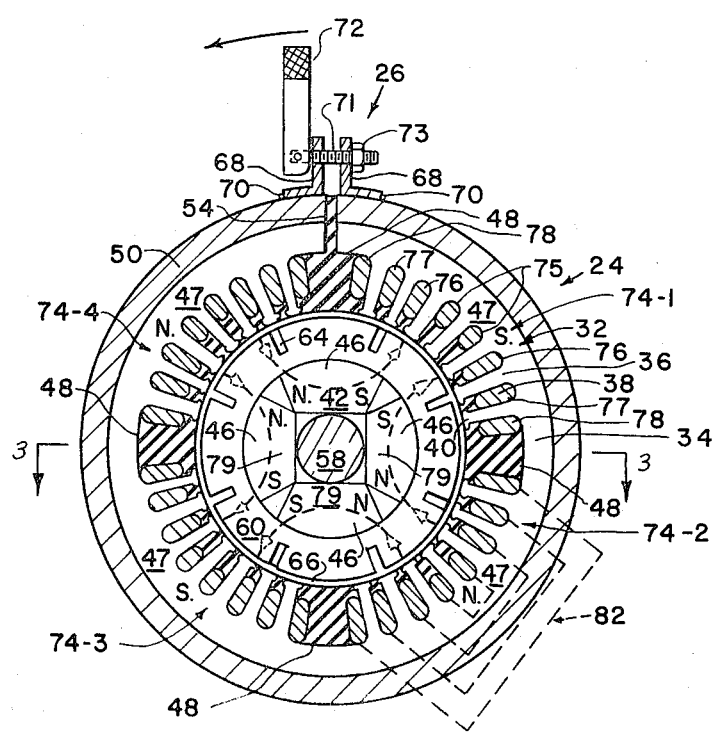
FIG. 2 is a transverse cross-sectional view taken generally along the line 2—2 of FIG. 1.
Figure 3:
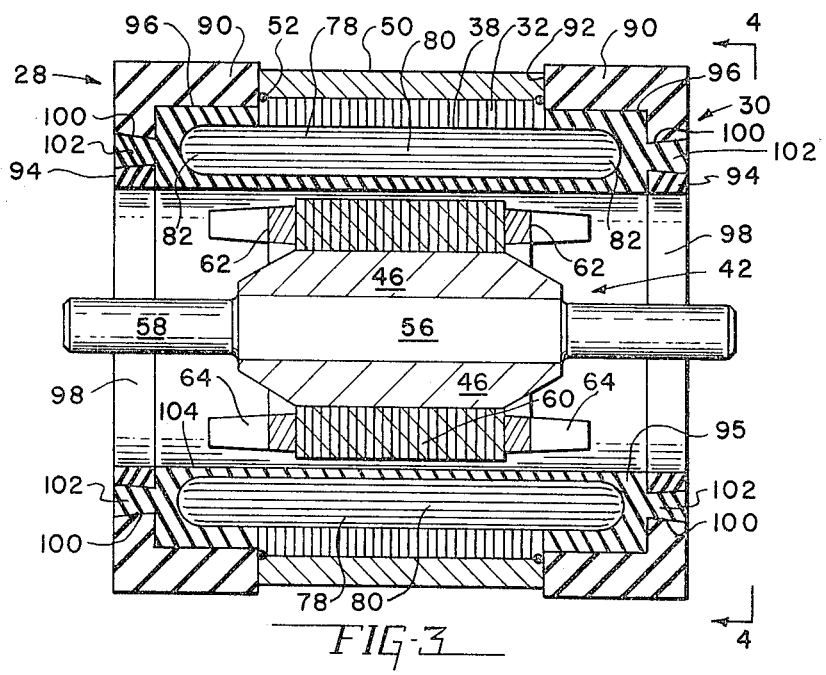
FIG. 3 is a side cross-sectional view taken generally along the line 3—3 of FIG. 2.
Figure 4:
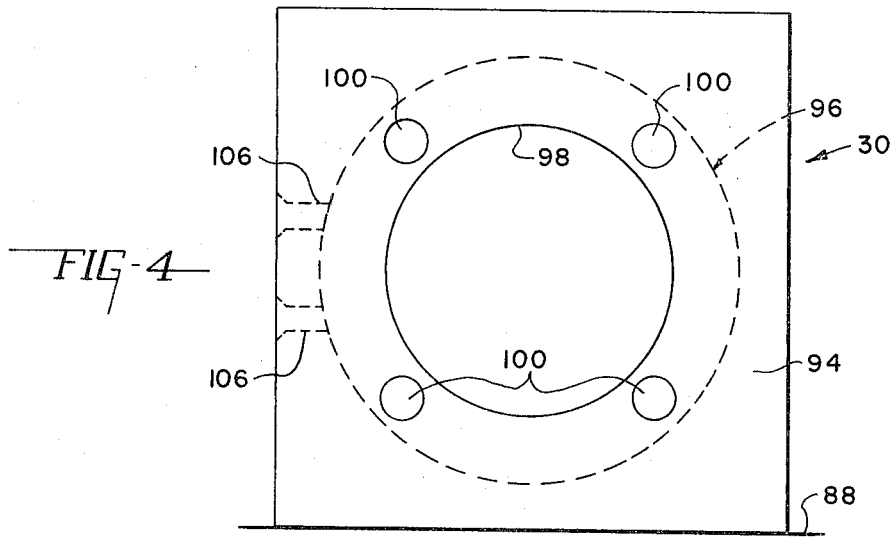
FIG. 4 is an end view as viewed along the line 4—4 of FIG. 3.

Referring now additionally to FIGS. 2, 3 and 4, apparatus 10 comprises stator assembly 24, clamping assembly 26, and a pair of end cap members 28, 30. Stator assembly 24 comprises stator core member 32 formed of a stacked plurality of relatively thin laminations of magnetic material and having a yoke portion 34 with a plurality of teeth 36 extending radially inwardly therefrom which define winding slots 38 therebetween. Teeth 36 have inner ends 40 defining a bore for receiving rotor member 42 to be magnetized.

In the illustrated embodiment adapted to magnetize rotor member 42 having four magnets 46, teeth 36 are arranged in four circumferentially spaced pole groups 47 thereby to define, in conjunction with the coils of the windings disposed in slots 38 as will hereinafter be described, four poles of alternate magnetic polarity, as indicated in FIG. 2. In a specific embodiment, a 36 tooth stator core member is employed with two teeth removed in each quadrant, thereby providing four pole groups 47 each having seven teeth 36 defining six winding slots 38 therebetween, adjacent groups of teeth 36 being spaced apart by wider slots 48.

Stator core member 32 is surrounded and embraced by steel ring 50, ring 50 being welded to stator core member 32 as at 52 (FIG. 3). Ring 50 and yoke portion 34 of stator core member 32 are longitudinally slit to define narrow slot 54 communicating with one of the wide slots 48 (FIG. 2).

Bars 46 of permanently magnetizable material, such as AL-NICO alloy material of General Electric Company, are machined to receive a rotor body 60 formed of a stack of relatively thin, magnetic material laminations. The rotor body 60 also has a squirrel cage winding cast in slots therein (not shown). This squirrel cape winding also includes short circuiting end rings 62 having fan blades 64 integrally formed thereon. Bars 46 are to be transversely magnetized to form oppositely polarized regions adjacent their side edges, as best seen in FIG. 2.

Clamping apparatus or assembly 26 is employed to move the facing portions of core member 32 and ring 50 which define slot 54 toward each other thereby to cause inner ends 40 of teeth 36 to engage and clamp the outer peripheral surface 66 of the rotor body 60 during the magnetizing operation. Clamping assembly 26 comprises a pair of angle members 68 secured to the outer peripheral surface of rotor body 60, as by welding at 70, respectively adjacent and on either side of slot 54, and a pair of manually actuable lever clamps 72 attached to angle members 68 by studs 71 and nuts 73. Lever clamps 72 are pivotally mounted on one of the angle members 68 and are arranged, when manually pivoted downwardly as viewed in FIG. 2, to cam the angle members 68 toward each other thereby to compress ring or split sleeve 50 and core member 32 so as to clamp rotor member 42.

Figure 5:
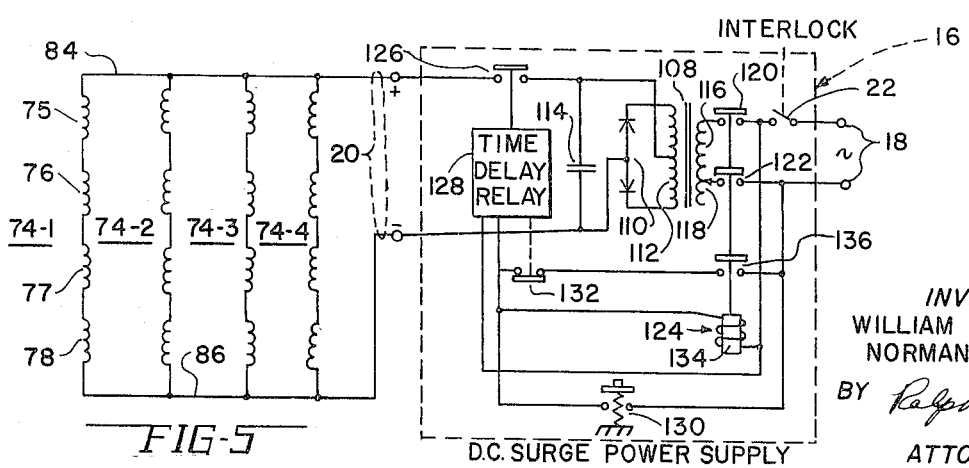
FIG. 5 is a schematic illustration showing a circuit for energizing the apparatus of FIG. 2 and showing one preferred power supply in rudimentary form.

Referring additionally to FIG. 5, winding means are accommodated by the pole groups 47. These windings each comprise one or more groups of coils, each group including one or more coil turns. In the preferred embodiment, four field windings 74-1, 74-2, 74-3 and 74-4 are provided each comprising four serially connected coils 75, 76, 77 and 78. Coils 75-78 of each winding 74 are concentrically positioned in distributed fashion in slots 38 of each pole group of teeth, it being observed that the largest coil 78 which spans the entire pole group 47 of teeth are positioned in the wider slots 48 (FIG. 2). Each coil 75-78 has side portions 80 positioned in a respective pair of slots 38 or 48 and end turn portions 82 respectively extending on opposite sides of core member 32 (FIG. 3).

Windings 74 are connected in parallel by leads 84, 86 (FIG. 5) and are arranged so that, when energized, the pole groups 47 of teeth 36 are alternately polarized "north" and "south," and a predetermined magnetic field is established having polarized regions in general alignment with the predetermined regions of blocks 46 to be magnetized, thereby producing magnetizing flux therein as shown in the dashed lines 79 in FIG. 2.

End cap members 28, 30 respectively have a rectangular outline (FIG. 4) to permit apparatus 10 to be supported on flat surface 88 of table 12. End cap members 28, 30 are formed of hardened insulating material, such as a hardened polyester resin reinforced or filled with a fibrous material, such as laminated cloth or paper. End cap members 28, 30 each have flange portion 90 having an edge 92 abutting the sides of core member 32 and ring 50, and an end wall 94, flange portions 90 and end walls 94 respectively defining annular cavities 96 which respectively receive and accommodate end turn portions 82 of coils 75-78. End walls 94 respectively have central openings 98 therein aligned with and forming extensions of the bore defined by inner ends 40 of teeth 36. End walls 94 respectively have four openings 100 formed therethrough which are respectively aligned with wide slots 48 of stator core member 32.

Windings 74 are embedded in a mass 95 of relatively soft potting compound which fills the unoccupied portions of slots 38 and 48 and cavities 96, and openings 100 in end walls 94 of end cap members 28, 30, as at 102. A mandrel or plug (not shown) is inserted through the fills openings 98 and the bore of stator core member 32 during injection of the potting compound through openings 100 in one end of cap members 28, 30 thus forming a continuous bore 104 with openings 98 forming extensions thereof.

Openings 100 have a slight outward taper (as shown in FIG. 3) and thus, when the potting compound has been injected through openings 100 in one end cap member 28, 30, slugs 102 which fill openings 100 serve to secure end cap members 28, 30 to stator core member 32 and ring 50. The potting compound will flow into and at least partially fill slot 54 in stator core member 32 and ring 50 (FIG. 2). The potting compound is sufficiently flexible to accommodate clamping of core member 32 and ring 50 by lever clamps 72. While a number of potting compounds are suitable, we have employed a room temperature curing urethane potting compound sold by Devon Co. and identified by that company as Flexane No. 95.

It will be observed that end cap members 28, 30 protect end turns 82 of coils 75-78, and that openings 98 and bore 104 formed in the potting compound surrounding end turns 82 form a passageway for guiding rotor member 42 into the bore of stator core member 32. End cap member 30 has openings 106 in one side wall communicating with cavity 96 through which power supply leads 20 extend.

The parallel connected windings 74 have very low resistance which is lower than the resistance of the field windings of prior magnetizing apparatus. In a specific embodiment employing a 28 (out of 36) tooth stator core member 32 having a bore diameter of 3.68 inch, coils 75-78 of each of the windings 74 were formed of 0.048 inch diameter copper wire and had 15, 30, 35 and 40 turns, respectively, the total resistance of the parallel-connected windings 74 being 0.189 ohm ± 5 percent.

Referring now particularly to FIG. 5, power supply 16 is preferably of the type shown in FIG. 15 of the aforesaid Linkous U.S. Pat. No. 3,333,329 and further described in detail in that patent. The power supply 16 is here shown in somewhat simplified form in FIG. 5 hereof for illustrative purposes only. Power supply 16 includes energy storage means and is shown here as comprising transformer 108 having full wave rectifier 110 coupled across its high voltage secondary winding 112, and capacitive energy storage means in the form of capacitor bank 114. The capacitor bank 114 is coupled to rectifier 110 and secondary winding 112 and is charged by the rectified high voltage. Primary winding 116 of transformer 108 is shown as including a selectively adjustable tap 118 thereby selectively to vary the voltage induced in secondary winding 112. The portion of primary winding 116 selected by tap 118 is coupled across source 18 by contacts 120, 122 of control relay 124 and interlock contacts 22.

Capacitor bank 114 is coupled across leads 20 for discharging through windings 74 by contacts 126 of time delay relay 128. Momentary contact "start" push button switch 130 initially connects time delay relay 128 for energization across source 18 and also initially couples operating coil 134 of control relay 124 for energization through normally closed contacts 132 of time delay relay 128. Energization of operating coil 134 of control relay 124 due to momentary closing of switch 130 closes sealing contacts 136, thereby maintaining operating coil 134 and time delay relay 128 energized despite opening of switch 130, energization of operating coil 134 closing line contacts 120, 122 to energize transformer 108 thereby to initiate charging of capacitor bank 114. In a specific embodiment, capacitor bank 114 is charged to 4,200 volts D.C. Upon expiration of the time delay period of time delay relay 128, 15 seconds in the specific embodiment, time delay relay 128 closes contacts 126 and simultaneously opens contacts 132. Capacitor bank 114 is thus coupled across leads 20 and the parallel-connected windings 74 thus discharging through the windings, opening of contacts 132 resulting in de-energization of operating coil 134 thus opening its contacts 120, 122 and 136 to de-energize transformer 108 and operating coil 134, and also de-energizing time delay relay 128. Discharge of capacitor bank 114 produces across the parallel-connected windings 74 a momentary high voltage pulse thereby causing a highly peaked surge of current flow in the windings. This in turn results in establishing a highly peaked magnetic field, as will be understood. In practice, power supply 18 is actuated twice in rapid succession for magnetizing each rotor assembly 42 in order to insure complete magnetization of magnets 42.

The exemplified distributed winding arrangement provides more iron for the generated magnetic flux. Further, we have found that the lower winding resistance and provision of a higher current peak is a very short period of time contributes to lower temperature rise in windings 74, thus permitting magnetizing a substantially higher number of rotor assemblies before the temperature of the windings rises to the point where the apparatus must be shut down to permit cooling of the windings. Thus, in the case of a rotor assembly having an outside diameter of 3.656 inches, a stack length (rotor body 60)

varying from 1⅝ inches to 3 inches, and four magnets 42, used in synchronous motors from 1/12 to 1 horsepower (at 60 cycles), it has been found that 15 rotor assemblies can be magnetized in 20 minutes before it becomes necessary to shut down the apparatus for cooling the windings, whereas in the prior magnetizing apparatus only six rotor assemblies could be magnetized in a period of time varying from 1 to 1½ hours, shutting down of the apparatus then being necessary for cooling purposes.

While a preferred form of apparatus and one preferred method has been illustrated and described in connection with magnetizing a particular rotor assembly incorporating four magnets, it will be readily apparent that the apparatus and method may be employed for magnetizing other types of permanent magnet rotor assemblies comprising different magnet configurations and/or a lesser or greater number of magnets.

While in accordance with the Patent Statutes, we have described what at present are considered to be preferred exemplifications of the invention, it will be obvious to those skilled in the art that numerous changes and modifications may be made therein without departing from the true spirit and scope of the invention, and it is therefore aimed in the following claims to cover all such modifications.

What we claim as new and desire to secure by Letters Patent of the United States Is:

1. Apparatus for magnetizing magnetic means for a rotor device for a dynamoelectric machine, the magnetic means including at least one member formed of permanently magnetizable material and having at least one pair of predetermined regions to be oppositely polarized, said apparatus comprising a magnetic stator core member having a yoke portion with a plurality of radially inwardly extending teeth defining winding slots therebetween, said teeth having inner ends defining a bore for receiving said rotor member, at least one pair of windings each comprising coil turns accommodated in selected ones of said slots, said pair of windings being connected and arranged when energized to establish a predetermined magnetic field and thereby magnetize the at least one member and form opposite magnetic poles in the member along the predetermined regions thereof, and power supply means coupled to said windings for producing thereacross a momentary high voltage pulse of preselected magnitude thereby to cause a highly peaked surge of current flow in said windings.

2. The apparatus of claim 1 wherein each of the pair of windings comprise a plurality of distributed coil turns.

3. The apparatus of claim 2 wherein the at least one pair of windings are connected in parallel.

4. The apparatus of claim 1 wherein the power supply means includes energy storage means, and includes means for sequentially coupling the energy storage means across a high voltage source thereby to store energy therein, and thereafter across said windings thereby to produce said pulse.

5. The apparatus of claim 4 wherein said coupling means includes time delay means for initially coupling said energy storage means across the high voltage source for a predetermined time interval and thereafter coupling said energy storage means with the windings.

6. The apparatus of claim 1 wherein the stator core member includes at east one pair of circumferentially spaced pole groups of teeth, each spaced pole group of teeth defining the slots in which the coils comprising a winding associated therewith are accommodated, and each forming a magnetic pole when the respective winding associated therewith is energized.

7. The apparatus of claim 1 wherein said yoke portion is longitudinally slit thereby forming facing portions which normally define a relatively narrow gap therebetween, and further comprising means for moving said facing portions toward each other thereby causing the inner ends of the teeth to engage and clamp a rotor device positioned adjacent thereto.

8. The apparatus of claim 7 wherein the windings are embedded in a mass of relatively flexible insulating material, the insulating material substantially filling the gap.

9. The apparatus of claim 7 wherein the windings each comprise coils having side turn portions respectively positioned in selected ones of the slots and end turn portions respectively extending from opposite sides of said core member, the apparatus further comprising a pair of end cap members respectively abutting said opposite sides of said core member and respectively having cavities therein for accommodating said end turn portions, at least one of said end cap members having an opening therethrough forming an extension of said bore, and means for securing said end cap members and core member in assembled relation.

10. The apparatus of claim 9 wherein said windings are embedded in a mass of relatively flexible insulating material, said insulating material substantially fills the gap and the end cap member cavities, and said securing means comprises opening defining surfaces in said end cap members which are substantially filled with said insulating material.

11. The apparatus of claim 10 further comprising a metallic ring embracing said core member, said ring having a slit in general alignment with the core member gap, said end cap members respectively abutting the opposite sides of said ring, and said moving means comprising clamping means for deforming said ring.

12. The apparatus of claim 11 wherein there are at least one pair of spaced pole groups of said teeth, each said pole group of teeth defining the preselected slots in which the coils comprising one winding are distributed and forming a magnetic pole when the respective winding is energized, said windings being connected in parallel and having relatively low resistance, the power supply means being of the capacitor discharge type and including time delay means for initially coupling a capacitor across a high voltage direct current potential for a predetermined relatively short charging interval and thereafter coupling said capacitor across said windings thereby to produce the pulse.

13. A method of magnetizing at least two spaced apart predetermined regions of at least two magnetizable members for a dynamoelectric machine rotor device, the method comprising the steps of: positioning the rotor device within a bore formed by a stator core assembly having windings accommodated in slots formed by teeth thereof and aligning preselected regions of the magnetizable members relative to the stator core assembly; clamping the stator core against the rotor device to maintain the alignment of the rotor device and stator core assembly; establishing a highly peaked magnetic field in the preselected regions of the magnetic core by surging a highly peaked voltage through the windings thereby to magnetize the magnetizable members, and removing the rotor device from the stator core assembly.

14. The method of claim 13 wherein the step of establishing a highly peaked magnetic field includes charging energy storage means for a high potential direct current source during a relatively short charging interval, and rapidly discharging the energy storage means through the windings on the stator core assembly.

* * * * *